United States Patent [19]

Lederman

[11] Patent Number: 5,048,651
[45] Date of Patent: Sep. 17, 1991

[54] UNITIZED ROLLER CLUTCH AND BEARING

[75] Inventor: Frederick E. Lederman, Sandusky, Ohio

[73] Assignee: General Motors Corporation, Detroit, Mich.

[21] Appl. No.: 389,472

[22] Filed: Aug. 4, 1989

[51] Int. Cl.$^5$ ............................................. F16D 41/06
[52] U.S. Cl. ........................................ 192/45; 384/572
[58] Field of Search ................... 192/45, 44, 110 B; 188/82.84; 384/127, 572, 576, 578, 579

[56] References Cited

U.S. PATENT DOCUMENTS

| | | |
|---|---|---|
| 2,591,161 | 4/1952 | Kilian .................................... 384/578 |
| 3,194,368 | 7/1965 | Benson et al. ......................... 192/45 |
| 3,990,555 | 11/1976 | Carullo .................................. 192/45 |
| 4,236,619 | 12/1980 | Kuroda .................................. 192/45 |
| 4,387,939 | 6/1983 | Walter et al. ........................ 384/578 |
| 4,679,676 | 7/1987 | King et al. ............................. 192/45 |
| 4,712,661 | 12/1987 | Lederman et al. ..................... 192/45 |
| 4,776,238 | 10/1988 | Premiski et al. ................. 384/572 X |
| 4,787,490 | 11/1988 | Lederman et al. .................... 192/45 |

Primary Examiner—Richard Lorence

[57] ABSTRACT

The advantages of metal side bearings and plastic one-piece cage are both provided in a unitary roller clutch assembly in which metal end rings have inner and outer flanges connected by an annular web, thereby creating annular cavities in which the parts of the cage that hold the unit together can be protected.

2 Claims, 3 Drawing Sheets

UNITIZED ROLLER CLUTCH AND BEARING

This invention relates to roller clutches in general, and specifically to such a clutch that is combined with a pair of heavy load side bearings.

BACKGROUND OF THE INVENTION

Overrunning roller clutches are used in automatic vehicle transmissions in conjunction with the various gear sets, to act as shift timers. There is a limited annular space available between an inner race and an outer race in which each roller clutch can be installed, and all components generally must fit within that limited space. Such roller clutches often have a molded plastic cage that retains the rollers and the roller energizing springs, and which can be shipped, handled and installed as a unit. Since it is also necessary that the races be maintained coaxial to one another, such cages are usually molded with bearing portions, known as journal blocks that fit closely between the races to maintain them spaced apart accurately. There are applications, however, where the radial loads that must be supported between the races are so severe that ordinary plastic journal blocks are insufficient. This is especially true when the roller clutch is in a location that sees the clamping load from a transmission band. In such cases, some kind of metal journal bearing must be provided between the races, bordering the roller clutch. A roller clutch assembly that combined the strength of metal journal bearings with the convenience of a molded plastic cage in an easily handled, unitary design, would be useful in such an application.

SUMMARY OF THE INVENTION

In the preferred embodiment disclosed, the combined bearing and roller clutch assembly of the invention is used in an automatic transmission environment where it is subject to heavy band loads. It is adapted to be installed in the annular space between a pair of conventional clutch races. A pair of identical metal end rings border the assembly, each of which has a generally I shaped cross-section, with an inner and outer cylindrical flange joined by an annular web. The total radial thickness of each end ring is just less than the ideal radial spacing between the races. The web bisects the flanges, and so defines an identical pair of annular cavities on either side. Each web also has a series of evenly spaced holes drilled through it.

Located between the end rings is a one-piece molded plastic cage. The cage has a plurality of evenly circumferentially spaced crossbars, each of which has a radial thickness greater than the ring webs, but less than the total radial thickness of the end rings. The axial width of each crossbar is just slightly greater than the length of a roller. Each crossbar is interconnected to an adjacent crossbar by axially alternating arcuate side rails. Each side rail has a radial thickness less than the web, and so fits with clearance between the end ring flanges. Integrally molded to each of the alternating side rails is a flexible latching finger with a hooked end, each of which snap fits through a respective web hole and holds the web under tension. A unit handled assembly of end rings and cage is thereby created. Both the arcuate side rails and the hooked ends of the latching fingers are contained and protected between the end ring flanges. The sides of the crossbars are held in solid abutment with the end ring flanges, creating a series of rectangular roller pockets. Because of the relation of crossbar and end ring thicknesses, the end ring flanges are unobstructed by the cage crossbars, and take the entire load through the races.

It is, therefor, an object of the invention to provide a combined bearing and roller clutch assembly in which a pair of metal end rings, which take the entire load between the clutch races, are held together by a plastic cage in such a way as to create a series of roller pockets while also protecting the plastic cage.

It is another object of the invention to provide such an assembly in which the end rings have inner and outer flanges connected by an annular web, thereby creating annular cavities in which the parts of the cage that hold the unit together can be protected.

It is another object of the invention to create such an assembly which is easily assembled, and which has a minimal number of components.

DESCRIPTION OF THE PREFERRED EMBODIMENT

These and other objects and features of the invention will appear from the following written description, and from the drawings, in which.

Figure 1:
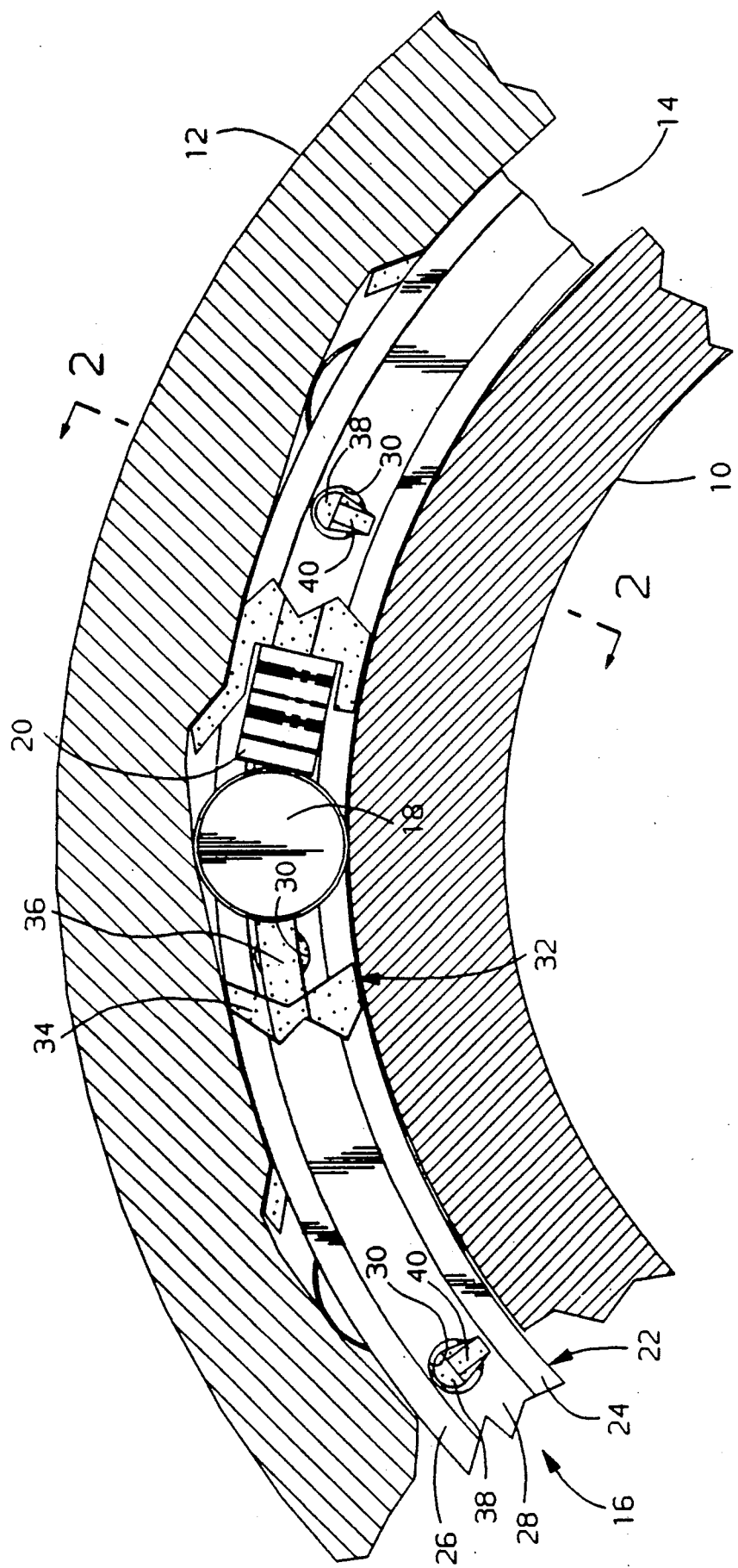
FIG. 1 is an end view of a portion of a pair of clutch races with a preferred embodiment of the combined bearing and roller clutch assembly of the invention installed.
Figure 2:
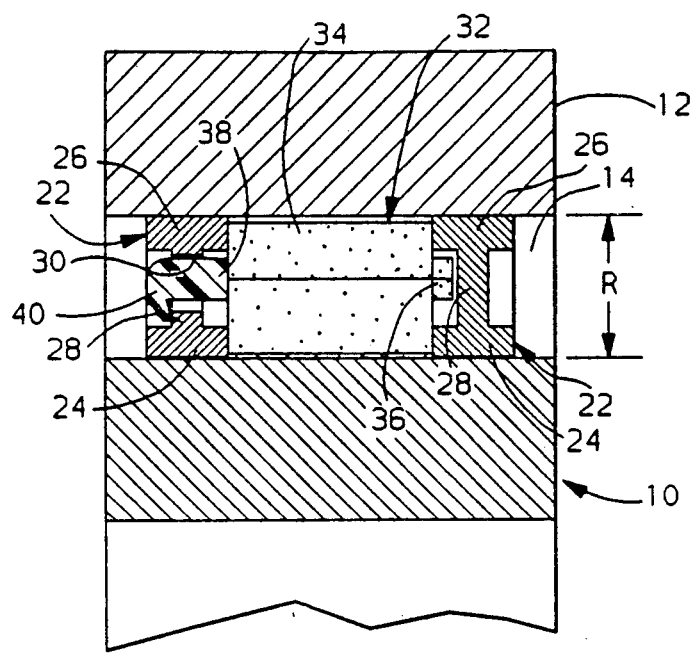
FIG. 2 is a cross-section of FIG. 1 taken along the line 2—2.

Referring first to FIGS. 1 and 2, the invention is adapted to be installed between a pair of conventional clutch races, an inner pathway race 10 and an outer cam race 12. The inner surfaces of the races 10 and 12, when they are maintained in concentric or coaxial relation, define an annular space 14 with a predetermined radial width R. A preferred embodiment of the invention, designated generally at 16, is adapted to be installed in space 14. Conventional rollers 18 and springs 20 provide selective relative rotation between races 10 and 12 in the usual manner. More important to the invention here, roller clutch assembly 16 must also maintain the races 10 and 12 coaxial and, in the automatic transmission environment where it is used, support very heavy band clamping loads of up to 40 kilonewtons. The components of clutch 16 do so, as well as creating an easily handled unitary assembly.

Figure 3:
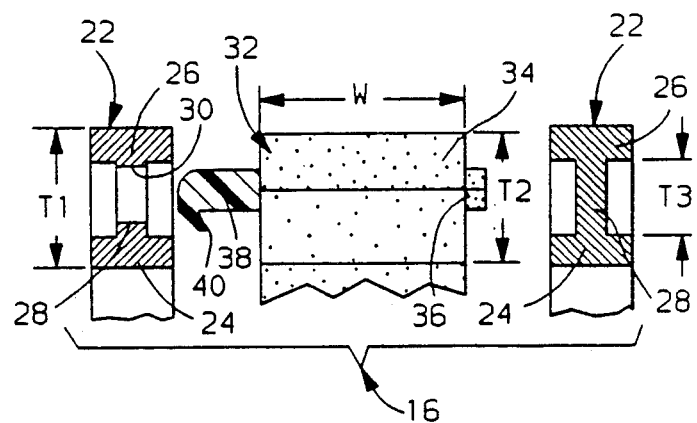
FIG. 3 is an exploded cross-sectional view of the components of the assembly.
Figure 6:
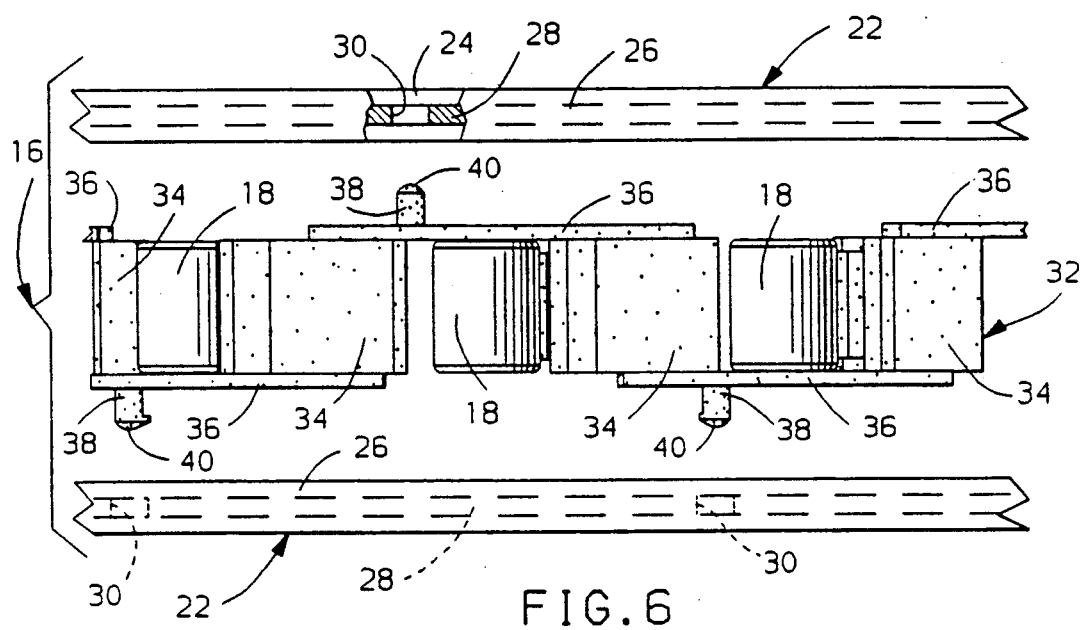
FIG. 6 is an exploded, rolled out view of the components.

Referring next to FIGS. 3 and 6, the bearing function is provided by a pair of identical bronze end rings, each of which is indicated generally at 22. Each end ring 22 has an I shaped cross-section, comprised of an inner cylindrical flange 24, an outer cylindrical flange 26, and connecting annular web 28. The total radial thickness T1 of each end ring 22, measured from the inner bearing surface of flange 24 to the outer bearing surface of flange 26, is close to R, just enough less to allow easy insertion into space 14. Being bronze, the bearing surfaces of end ring 22 can be ground with a high degree of precision. The flanges 24 and 26 are more than axially wide enough to provide sufficient bearing surface to keep the races 10 and 12 coaxial, but web 28 need not be as wide in order to provide sufficient load support. The thinner web 28 is centrally located, and so defines, with the flanges 24 and 26, a pair of same size annular cavities on either side of web 28. The thickness of the cavities, that is, the radial thickness of the webs 28, is indicated at T3 in FIG. 3. In addition, a plurality of evenly circumferentially spaced round passages or holes 30 is drilled through each web 28, equal to one half the number of rollers 18.

Figure 4:
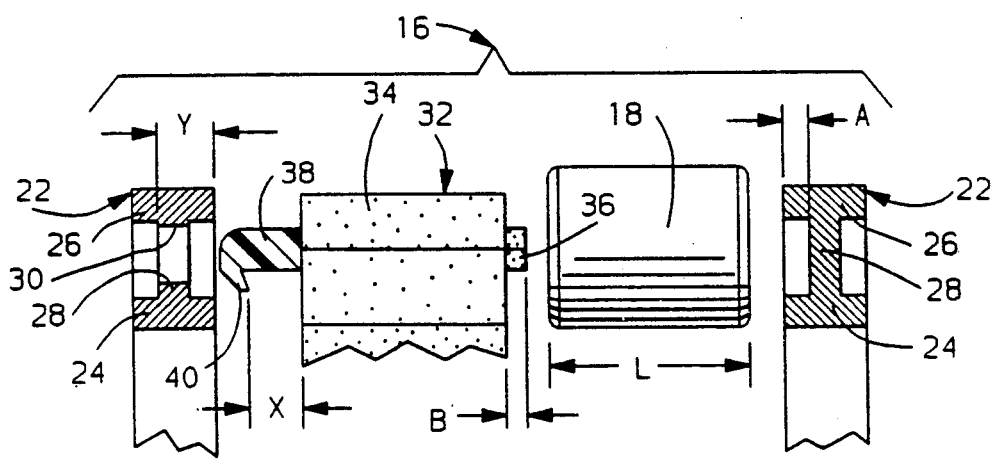
FIG. 4 is a view like 3, but showing a roller.
Figure 7:
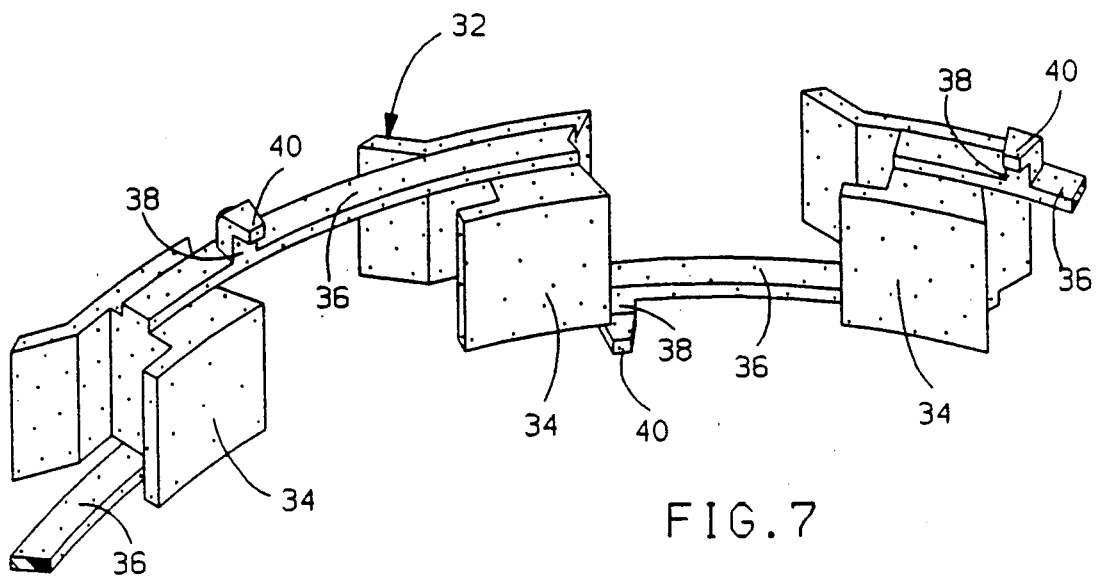
FIG. 7 is a perspective view of a portion of the cage.

Referring next to FIGS. 3, 4 and 7, the other main component of clutch 16 is a one-piece molded plastic cage, indicated generally at 32. Cage 32 includes a plurality of evenly circumferentially spaced crossbars 34, one for each roller 18. Each crossbar 34 has a radial thickness, indicated at T2, which is greater than T3, but slightly less that T1. Each crossbar 34 also has an axial width W just slightly greater than the length L of a roller 18. Each crossbar 34 is interconnected to an adjacent crossbar 34 on alternate axial sides by a plurality of arcuate side rails 36. Each side rail 36 has a radial thickness less than web 28, and so fits with radial clearance into the cavity between the flanges 24 and 26. Each side rail 36 also has an axial width B that is less than the width from the inboard surface of web 28 to the inboard edges of flanges 24 and 26, indicated at A. That A-B differential, in the embodiment disclosed, is about 0.1 millimeters. Integrally molded to each of the alternating side rails 36 is an axially extending flexible latching finger 38, with a hooked end 40. Each hooked end is sized so as to snap fit through a hole 30. The axial width from the side of crossbar 34 to the inside surface of hooked end 40, X, is slightly less than the axial width from the outboard surface of web 28 to the inboard edges of flanges 24 and 26, indicated at Y. That Y-X differential, in the embodiment disclosed, is also about 0.1 millimeters. Because none of the surfaces of cage 32 radially overlap one another, not only may it be molded in one-piece, but it may also be by-pass molded.

Figure 5:
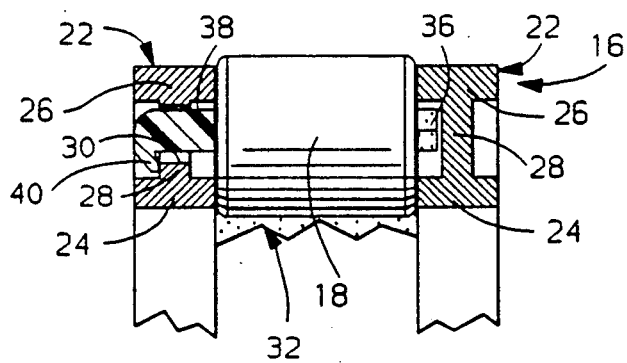
FIG. 5 is a cross-sectional view of the assembly before installation.

Referring next to FIGS. 2, 5 and 6, to assemble clutch 16, the cage 32 and end rings 22 are aligned so that each hooked end 40 registers with a respective web hole 30. Then, the end rings 22 are moved in so that each hooked end 40 snaps through its respective web hole 30, giving a unitary assembly. Because of the Y-X differential, the outboard surfaces of the webs 28 are held under tension by the hooked ends 40, which are themselves sheltered and protected by the overhanging flanges 24 and 26, giving a rattle free assembly. The A-B differential assures that, while each side rail 36 is sheltered and protected between the flanges 24 and 26, it does not bind on the inboard surface of the webs 28, and so does not interfere with the holding power of the hooked ends 40. Because of the relation between T1, T2 and T3, the sides of the crossbars 34 are kept in tight abutment with the flanges 24 and 26, creating a series of rectangular pockets for the rollers 18 and springs 20. Clutch 16 would be installed between races 10 and 12 as a conventional clutch would, as shown in FIG. 2. Because of the differential between T2 and T1, the bearing surfaces of the flanges engage the races 10 and 12, but the crossbars 34 do not. Thus, all the load between the races 10 and 12 is taken through the end rings 22, and the crossbars 34 are protected. In conclusion, the advantages of separate metal side bearings and a one-piece plastic cage both are obtained in a unitary assembly that protects all parts of the plastic cage, and which is simple to manufacture, assemble and install.

Variations of the preferred embodiment could be made. For example, a different clasp means could be used to hold the end rings together. It should be understood, therefor, that it is not intended to limit the invention to just the embodiment disclosed.

The embodiments of the invention in which an exclusive property or privilege is claimed are defined as follows:

1. A combined bearing and roller clutch assembly for providing load support and selective relative rotation between a pair of clutch races, said assembly comprising, a plurality of rollers, a pair of end rings, each having a generally I shaped cross-section formed by a pair of cylindrical flanges connected by a web defining a pair of cavities, one on each axial side of each of said end rings, each of said webs also having a series of passages therethrough, a one-piece cage including a plurality of evenly circumferentially spaced crossbars interconnected by a plurality of axially alternating side rails having a radial thickness less than said web, and, clasp means on said cage extending through said end ring web passages and into said cavities to hold said crossbars in abutment with said end ring flanges, whereby, said end rings and cage are retained together as a unit, with said cage crossbars and flanges creating a plurality of roller pockets, and with said side rails and clasp means contained and protected within said cavities between said end ring flanges.

2. A combined bearing and roller clutch assembly for providing load support and selective relative rotation between a pair of clutch races, said assembly comprising, a plurality of rollers, a pair of identical end rings, each having an inner and an outer cylindrical bearing surface and a predetermined radial thickness as measured radially between said bearing surfaces, each of said end rings also having a generally I shaped cross-section formed by a pair of cylindrical flanges connected by a web of predetermined radial thickness so as to define a pair of annular cavities, one on each axial side of each of said end rings, each of said webs also having a series of passages therethrough, a one-piece cage including a plurality of evenly circumferentially spaced crossbars with a radial thickness greater than said ring webs but less than said end rings, said crossbars being interconnected by a plurality of axially alternating, arcuate side rail segments having a radial thickness less than said webs, and, a series of flexible latches on said cage extending through said end ring passages and into said cavities to hold said crossbars in tensioned abutment with said end ring flanges, whereby, said end rings and cage are retained together as a solid unitary assembly, with said cage crossbars and flanges creating a plurality of roller pockets, and with said arcuate side rails and latches contained and protected in the annular cavities between said end ring flanges and with the bearing surfaces of said end ring flanges unobstructed by said cage crossbars by virtue of the thickness differential between said end rings and cross bars.

* * * * *